US010362210B2

(12) United States Patent
Kuwabara

(10) Patent No.: US 10,362,210 B2
(45) Date of Patent: Jul. 23, 2019

(54) TRANSMISSION CONTROL DEVICE AND TRANSMISSION CONTROL METHOD FOR TRANSMITTING IMAGE

(71) Applicant: FUJITSU LIMITED, Kawasaki-shi, Kanagawa (JP)

(72) Inventor: Hiroshi Kuwabara, Suginami (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/886,972

(22) Filed: Feb. 2, 2018

(65) Prior Publication Data

US 2018/0227474 A1 Aug. 9, 2018

(30) Foreign Application Priority Data

Feb. 7, 2017 (JP) ................. 2017-020569

(51) Int. Cl.
| G06F 1/16 | (2006.01) |
| H04N 5/38 | (2006.01) |
| H04N 7/08 | (2006.01) |
| G02B 27/01 | (2006.01) |
| H04L 12/28 | (2006.01) |
| H04N 5/232 | (2006.01) |

(52) U.S. Cl.
CPC .......... H04N 5/232 (2013.01); G06F 1/1686 (2013.01); H04L 12/28 (2013.01); H04N 5/38 (2013.01); G02B 27/017 (2013.01); H04N 7/08 (2013.01)

(58) Field of Classification Search
CPC ...... H04N 5/23245; H04N 5/232; H04N 5/38; H04N 7/08; G06F 1/1686; H04L 12/28
See application file for complete search history.

(56) References Cited

U.S. PATENT DOCUMENTS

| 7,280,702 | B2 * | 10/2007 | Chang ................. G06T 1/00 375/E7.065 |
| 7,774,712 | B2 * | 8/2010 | Laff ................. G06F 3/0481 715/708 |
| 8,941,561 | B1 * | 1/2015 | Starner ................. G06F 3/012 345/7 |
| 9,325,951 | B2 * | 4/2016 | Saptharishi ............ H04N 5/772 |
| 9,684,841 | B2 * | 6/2017 | Cheung ............... G06T 5/50 |
| 9,860,536 | B2 * | 1/2018 | Cilia .................. H04N 19/17 |
| 2007/0024706 | A1 * | 2/2007 | Brannon, Jr. ...... H04N 7/17318 348/142 |

(Continued)

FOREIGN PATENT DOCUMENTS

| JP | 2000-184367 | 6/2000 |
| JP | 2005-323310 | 11/2005 |
| JP | 2008-245313 | 10/2008 |

Primary Examiner — Nicholas G Giles
(74) Attorney, Agent, or Firm — Fujitsu Patent Center

(57) ABSTRACT

A transmission control device includes, a memory, and a processor coupled to the memory and the processor configured to, transmit a first captured image to apparatus when acquiring the first captured image obtained by imaging by a camera, receive a request including range information from the apparatus after transmitting the first captured image, extract a first image from a second captured image in accordance with range information, the second captured image being obtained by imaging by the camera, and transmit the extracted first image and position information of a range corresponding to the range information in the second captured image to the apparatus.

15 Claims, 13 Drawing Sheets

(56) References Cited

U.S. PATENT DOCUMENTS

| | | | | |
|---|---|---|---|---|
| 2007/0230943 A1* | 10/2007 | Chang | ............... | G03B 37/00 |
| | | | | 396/322 |
| 2008/0129844 A1* | 6/2008 | Cusack | ............... | H04N 5/232 |
| | | | | 348/241 |
| 2009/0300692 A1* | 12/2009 | Mavlankar | ....... | H04N 21/23431 |
| | | | | 725/94 |
| 2015/0178318 A1* | 6/2015 | Lee | ............... | H04N 1/2116 |
| | | | | 348/231.3 |

* cited by examiner

TRANSMISSION CONTROL DEVICE AND TRANSMISSION CONTROL METHOD FOR TRANSMITTING IMAGE

CROSS-REFERENCE TO RELATED APPLICATION

This application is based upon and claims the benefit of priority of the prior Japanese Patent Application No. 2017-20569, filed on Feb. 7, 2017, the entire contents of which are incorporated herein by reference.

FIELD

The embodiments discussed herein are related to transmission control technology.

BACKGROUND

In recent years, there has been a case in which a worker at a work site wears a head-mounted display (hereinafter, referred to also as HMD) and terminal apparatus and carries out work with reference to work instructions, manual and so forth. Furthermore, it has been proposed that a support person who supports the worker uses information processing apparatus coupled to the terminal apparatus of the worker through a network to share captured images obtained by imaging by the HMD or terminal apparatus and issue work instructions. At this time, for example, the support person desires to check a captured image in which the manufacturing number of a component appears in some cases.

For example, related arts are disclosed in Japanese Laid-open Patent Publication Nos. 2008-245313, 2000-184367, and 2005-323310.

SUMMARY

According to an aspect of the embodiments, a transmission control device includes, a memory, and a processor coupled to the memory and the processor configured to, transmit a first captured image to apparatus when acquiring the first captured image obtained by imaging by a camera, receive a request including range information from the apparatus after transmitting the first captured image, extract a first image from a second captured image in accordance with range information, the second captured image being obtained by imaging by the camera, and transmit the extracted first image and position information of a range corresponding to the range information in the second captured image to the apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, if a captured image is obtained by imaging at a position remote from the target component, it is difficult to make out the manufacturing number of the component in some cases. For this reason, for example, a support person attempts to make out the manufacturing number by magnifying the captured image but it becomes difficult to discern which part in the original captured image the magnified image is in some cases.

Embodiments of a transmission control program, method, and a transmission control apparatus disclosed by the present application will be described in detail below based on the drawings. The disclosed techniques are not limited by the present embodiments. Furthermore, the following embodiments may be combined as appropriate within such a range as not to cause contradiction.

Embodiment 1

Figure 1:
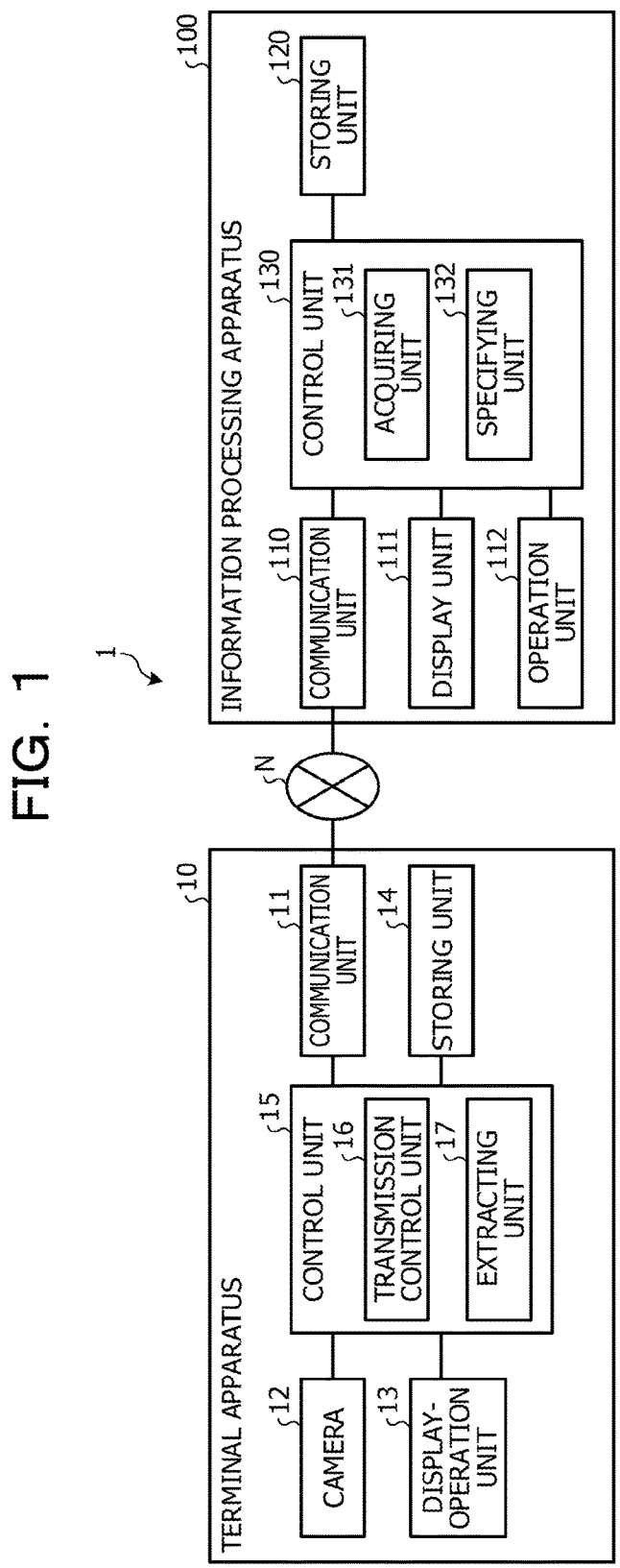
FIG. 1 is a block diagram illustrating one example of a configuration of a transmission control system of embodiment 1.

FIG. 1 is a block diagram illustrating one example of a configuration of a transmission control system of embodiment 1. A transmission control system 1 illustrated in FIG. 1 includes terminal apparatus 10 and information processing apparatus 100. Although the case in which the transmission control system 1 includes one piece of terminal apparatus 10 and one piece of information processing apparatus 100 is illustrated in FIG. 1, the numbers of pieces of terminal apparatus 10 and information processing apparatus 100 are not limited and the transmission control system 1 may have arbitrary numbers of pieces of terminal apparatus 10 and information processing apparatus 100.

The terminal apparatus 10 and the information processing apparatus 100 are coupled mutually communicably through a network N. As such a network N, an arbitrary kind of communication network such as the Internet, a local area network (LAN), or a virtual private network (VPN) may be employed irrespective of whether the communication network is a wired network or a wireless network.

The transmission control system 1 is one example of a system in which instructions are issued by sharing an image on a screen of the terminal apparatus 10 between the terminal apparatus 10 of a worker and the information processing apparatus 100 of a support person and remote support with remote operation of the terminal apparatus 10 is carried out. For example, the terminal apparatus 10 is information processing apparatus worn with an HMD by a worker who carries out an inspection, and is information processing apparatus for carrying out inspection work with reference to work instructions, manual and so forth. The information processing apparatus 100 is information processing apparatus used by the support person who supports the worker and is information processing apparatus that issues instructions by sharing an image on the screen of the terminal apparatus 10 with the terminal apparatus 10 of the worker and remotely operates the terminal apparatus 10.

When acquiring a captured image obtained by imaging by a camera, the terminal apparatus 10 transmits the acquired captured image to the information processing apparatus 100. When accepting an image acquisition request that is transmitted from the information processing apparatus 100 and includes range information, the terminal apparatus 10 extracts an image in the range according to the range information in the captured image obtained by imaging by the camera. The terminal apparatus 10 transmits the image that has been extracted and position information of the range in the acquired captured image to the information processing apparatus 100. This allows the terminal apparatus 10 to cause the image in the specified range to be displayed at the position according to the specified range in the captured image.

Next, the configuration of the terminal apparatus 10 will be described. As illustrated in FIG. 1, the terminal apparatus 10 includes a communication unit 11, a camera 12, a display-operation unit 13, a storing unit 14, and a control unit 15. The terminal apparatus 10 may include functional units such as various kinds of input devices and sound output devices, besides the functional units illustrated in FIG. 1.

The communication unit 11 is implemented by a mobile phone line such as a third-generation mobile communication system or long term evolution (LTE), a communication module of a wireless LAN or the like. The communication unit 11 is a communication interface that is wirelessly coupled to the information processing apparatus 100 through the network N and is responsible for communication of information with the information processing apparatus 100. The communication unit 11 transmits, to the information processing apparatus 100, a captured image, an extracted image, and the position information of a range that are input from the control unit 15. Furthermore, the communication unit 11 receives an image acquisition request from the information processing apparatus 100. The communication unit 11 outputs the received image acquisition request to the control unit 15.

The camera 12 is provided in the HMD worn by a worker and carries out imaging of the front side of the worker, for example. The camera 12 captures an image by using a complementary metal oxide semiconductor (CMOS) image sensor, a charge coupled device (CCD) image sensor or the like as an imaging element, for example. The camera 12 carries out photoelectric conversion of light received by the imaging element and carries out analog/digital (A/D) conversion to generate the captured image. The camera 12 outputs the generated captured image to the control unit 15.

The display-operation unit 13 is a display device for displaying various kinds of information and is an input device that accepts various kinds of operation from the worker who is a user. For example, the display-operation unit 13 is implemented by a liquid crystal display or the like as the display device. Furthermore, for example, the display-operation unit 13 is implemented by a touch panel or the like as the input device. For example, in the display-operation unit 13, the display device and the input device are integrated. The display-operation unit 13 outputs operation input by the worker to the control unit 15 as operation information.

The storing unit 14 is implemented by semiconductor memory elements such as random access memory (RAM) and flash memory and storing devices such as hard disk and optical disk. The storing unit 14 stores information used for processing in the control unit 15.

The control unit 15 is implemented through execution of a program stored in an internal storing device with use of the RAM as a work area by a central processing unit (CPU), a micro processing unit (MPU) or the like. Furthermore, the control unit 15 may be implemented by an integrated circuit such as an application specific integrated circuit (ASIC) or a field programmable gate array (FPGA). The control unit 15 includes a transmission control unit 16 and an extracting unit 17 and implements or executes functions and operation of information processing to be described below. The internal configuration of the control unit 15 is not limited to the configuration illustrated in FIG. 1 and may be another configuration as long as the internal configuration is a configuration to execute the information processing to be described later.

In the transmission control unit 16, an instruction to acquire the captured image obtained by imaging by the camera 12 and transmit the acquired captured image to the information processing apparatus 100 is made by operation by the worker, for example. The transmission control unit 16 starts transmission of the acquired captured image to the information processing apparatus 100 through the communication unit 11 and the network N.

When an extracted image and the position information of a range are input from the extracting unit 17 to the transmission control unit 16, the transmission control unit 16 transmits the extracted image and the position information of the range that have been input to the information processing apparatus 100 through the communication unit 11 and the network N. For example, the transmission control unit 16 transmits the image that has been extracted and the position information of the range in the acquired captured image to the information processing apparatus 100.

The transmission control unit 16 determines whether or not to stop the transmission of the captured image based on input of stop operation by the worker and so forth, for example. If the transmission of the captured image is not stopped, the transmission control unit 16 continuously carries out the acquisition and transmission of the captured image. If the transmission of the captured image is stopped, the transmission control unit 16 stops the acquisition and transmission of the captured image.

The extracting unit 17 determines whether or not an image acquisition request has been received from the information processing apparatus 100 through the network N and the communication unit 11. If an image acquisition request has not been received, the extracting unit 17 continuously waits for reception of an image acquisition request. If an image acquisition request has been received, the extracting unit 17 acquires a captured image with high image quality from the camera 12. For example, the extracting unit 17 instructs the camera 12 to carry out imaging of an image with high image quality. The captured image with high image quality is a captured image with higher image quality than the captured image that is acquired by the transmission control unit 16 and is transmitted to the information processing apparatus 100, for example.

The extracting unit 17 extracts an image in the range according to range information included in the image acquisition request from the acquired captured image with high image quality. The image extracted by the extracting unit 17 may be either a still image or a moving image in the range according to the range information. The extracting unit 17 outputs the image that has been extracted and the position information of the range that has been extracted to the transmission control unit 16 as the extracted image and the position information of the range. For example, when accepting the image acquisition request that is transmitted from the information processing apparatus 100 and includes the range information, the extracting unit 17 extracts an image in the range according to the range information in the captured image obtained by imaging by the camera 12. The range information included in the image acquisition request is information that represents the range decided based on a position input in the information processing apparatus 100.

Subsequently, the configuration of the information processing apparatus 100 will be described. As illustrated in FIG. 1, the information processing apparatus 100 includes a communication unit 110, a display unit 111, an operation unit 112, a storing unit 120, and a control unit 130. The information processing apparatus 100 may include functional units such as various kinds of input devices and sound output devices, besides the functional units illustrated in FIG. 1.

The communication unit 110 is implemented by a mobile phone line such as a third-generation mobile communication system or LTE, a communication module of a wireless LAN or the like. Furthermore, the communication unit 110 is, for example, implemented by a network interface card (NIC) or the like in the case of communicating with the terminal apparatus 10 through a radio base station of a mobile phone line or the like. The communication unit 110 is a communication interface that is coupled to the terminal apparatus 10 through the network N in a wireless or wired manner and is responsible for communication of information with the terminal apparatus 10. The communication unit 110 receives a captured image, an extracted image, and the position information of a range from the terminal apparatus 10. The communication unit 110 outputs the captured image, the extracted image, and the position information of the range that are received to the control unit 130. Furthermore, the communication unit 110 transmits an image acquisition request input from the control unit 130 to the terminal apparatus 10.

The display unit 111 is a display device for displaying various kinds of information. The display unit 111 is implemented by a liquid crystal display or the like as the display device, for example. The display unit 111 displays various kinds of screens such as a display screen input from the control unit 130.

The operation unit 112 is an input device that accepts various kinds of operation from a support person who is a user of the information processing apparatus 100. The operation unit 112 is implemented by keyboard, mouse and so forth as the input device, for example. The operation unit 112 outputs operation input by the support person to the control unit 130 as operation information. The operation unit 112 may be implemented by a touch panel or the like as the input device, and the display device of the display unit 111 and the input device of the operation unit 112 may be integrated.

The storing unit 120 is implemented by semiconductor memory elements such as RAM and flash memory and storing devices such as hard disk and optical disk. The storing unit 120 stores information used for processing in the control unit 130.

Referring back to FIG. 1, the control unit 130 is implemented through execution of a program stored in an internal storing device with use of the RAM as a work area by a CPU, an MPU or the like, for example. Furthermore, the control unit 130 may be implemented by an integrated circuit such as an ASIC or an FPGA. The control unit 130 includes an acquiring unit 131 and a specifying unit 132 and implements or executes functions and operation of information processing to be described below. The internal configuration of the control unit 130 is not limited to the configuration illustrated in FIG. 1 and may be another configuration as long as the internal configuration is a configuration to execute the information processing to be described later.

The acquiring unit 131 is coupled to the terminal apparatus 10 of a support target based on operation by the support person, for example. When receiving a captured image from the coupled terminal apparatus 10, the acquiring unit 131 starts display on the display unit 111 regarding the received captured image.

The acquiring unit 131 receives and acquires an extracted image and the position information of a range from the terminal apparatus 10 through the network N and the communication unit 110. Based on the acquired position information of the range, the acquiring unit 131 causes the display unit 111 to display the extracted image with the captured image. The acquiring unit 131 causes the display unit 111 to display an image obtained by clipping a range corresponding to the extracted image from the captured image and fitting the extracted image into this range, for example. For example, the acquiring unit 131 causes the image in the specified range input by the specifying unit 132 to be displayed at the position according to the specified range in the captured image.

The acquiring unit 131 determines whether or not to stop the reception of the captured image based on input of stop operation by the support person and so forth, for example. If the reception of the captured image is not stopped, the acquiring unit 131 continuously carries out the reception and display of the captured image. If the reception of the captured image is stopped, the acquiring unit 131 stops the reception and display of the captured image.

The specifying unit 132 determines whether or not range specifying has been input to the captured image displayed on the display unit 111 from the support person through the operation unit 112. If range specifying has been input, the specifying unit 132 transmits an image acquisition request including information on the input range specifying with respect to the captured image (hereinafter, referred to as range information) to the terminal apparatus 10 through the communication unit 110 and the network N. For example, the specifying unit 132 accepts the input of the specified range from the support person and transmits the image acquisition request including the range information that represents the accepted specified range to the terminal apparatus 10. For example, the range information is information that represents the range decided based on a position input from the support person. If range specifying has not been input, the specifying unit 132 continuously waits for input of range specifying.

Figure 2:
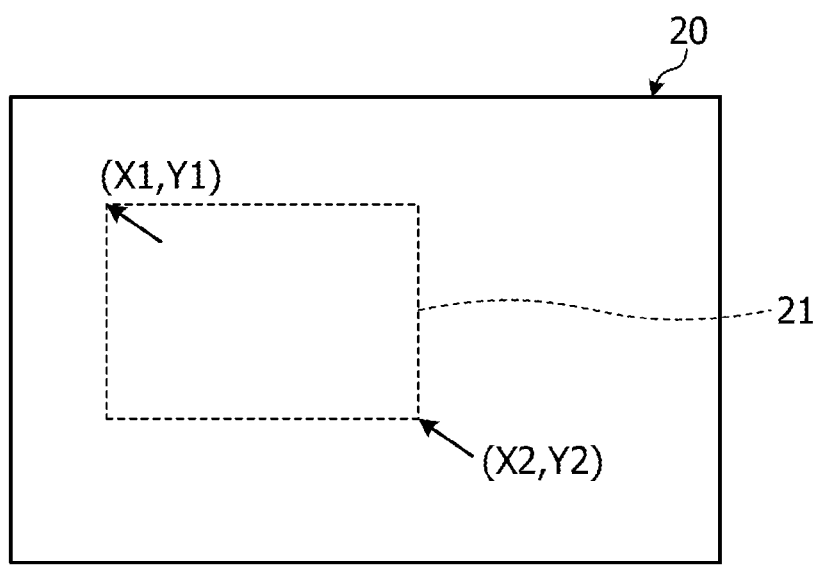
FIG. 2 is a diagram illustrating one example of range specifying.

Here, description will be made about range specifying and display of an extracted image by using FIG. 2 to FIG. 4. FIG. 2 is a diagram illustrating one example of range specifying.

As illustrated in FIG. 2, when coordinates (X1, Y1) and coordinates (X2, Y2) are specified in a display screen 20 that displays a captured image by mouse operation, for example, the specifying unit 132 generates an image acquisition request including range information that represents a range 21 specified based on these coordinates. The specifying unit 132 transmits the generated image acquisition request to the terminal apparatus 10. This allows the specifying unit 132 to accurately specify the range intended by the support person.

Figure 3:
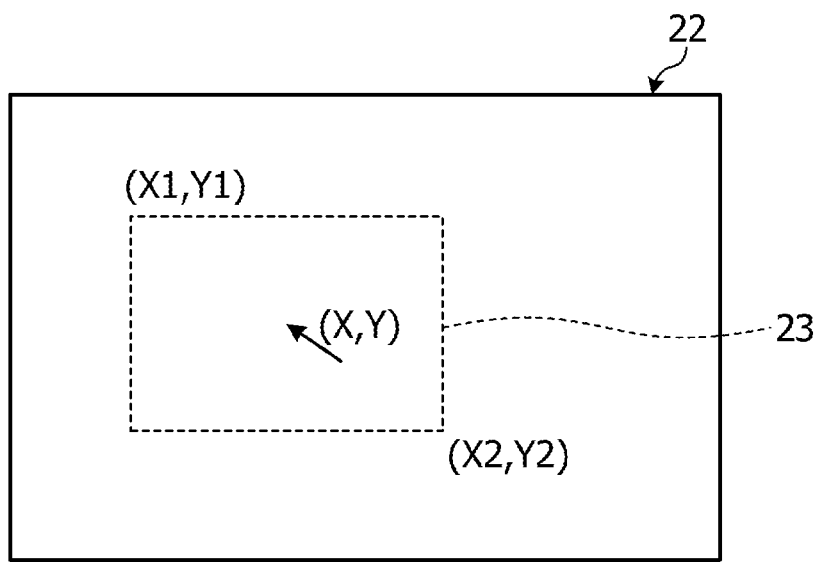
FIG. 3 is a diagram illustrating another example of range specifying.

FIG. 3 is a diagram illustrating another example of range specifying. As represented in a display screen 22 in FIG. 3, when coordinates (X, Y) are specified by mouse operation, for example, the specifying unit 132 may employ coordinates (X1, Y1) and coordinates (X2, Y2) that represent a range 23 centered at the coordinates (X, Y) as range information. This allows the specifying unit 132 to specify the range intended by the support person through simple operation compared with FIG. 2.

Figure 4:
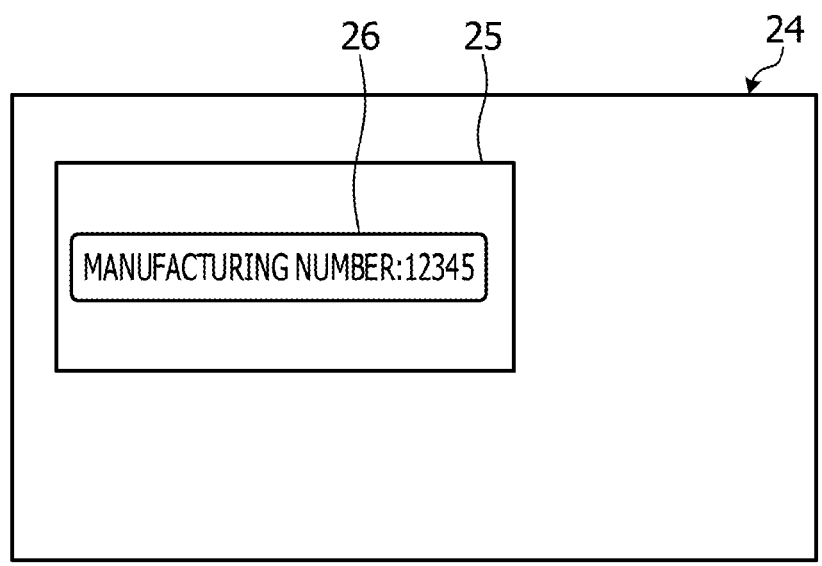
FIG. 4 is a diagram illustrating one example of display of an extracted image.

FIG. 4 is a diagram illustrating one example of display of an extracted image. A display screen 24 illustrated in FIG. 4 is one example in which an extracted image 25 is displayed at a position according to the position information of a range in a captured image. For example, the extracted image 25 is what is obtained by extracting an image in the range according to range information included in an image acquisition request received from the information processing apparatus 100 from a captured image with high image quality in which it is possible to make out a manufacturing number on a nameplate 26 of a component.

Figure 5:
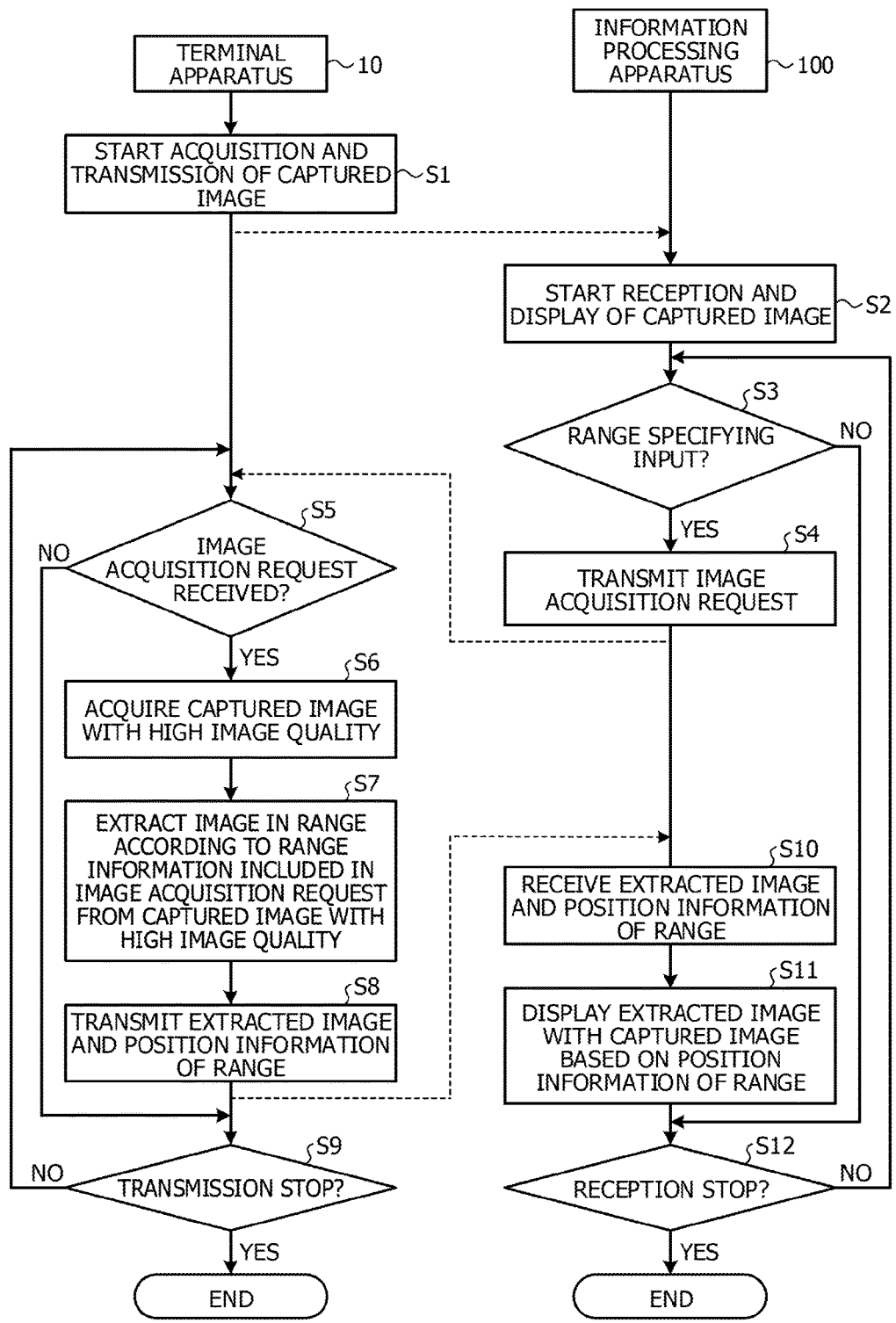
FIG. 5 is a sequence diagram illustrating one example of transmission control processing of embodiment 1.

Next, operation of the transmission control system 1 of embodiment 1 will be described. FIG. 5 is a sequence diagram illustrating one example of transmission control processing of embodiment 1.

When the transmission control unit 16 of the terminal apparatus 10 is instructed to acquire the captured image obtained by imaging by the camera 12 and transmit the acquired captured image to the information processing apparatus 100 by operation by a worker, for example, the transmission control unit 16 starts acquisition and transmission of the captured image (step S1). The acquiring unit 131 of the information processing apparatus 100 starts reception of the captured image from the terminal apparatus 10 and display of the captured image on the display unit 111 (step S2).

The specifying unit 132 of the information processing apparatus 100 determines whether or not range specifying has been input to the captured image (step S3). If range specifying has been input (step S3: Yes), the specifying unit 132 transmits an image acquisition request including range information to the terminal apparatus 10 (step S4). If range specifying has not been input (step S3: No), the specifying unit 132 makes a transition to a step S12.

The extracting unit 17 of the terminal apparatus 10 determines whether or not an image acquisition request has been received from the information processing apparatus 100 (step S5). If an image acquisition request has not been received (step S5: No), the extracting unit 17 makes a transition to a step S9. If an image acquisition request has been received (step S5: Yes), the extracting unit 17 acquires a captured image with high image quality from the camera 12 (step S6). The extracting unit 17 extracts an image in the range according to range information included in the image acquisition request from the acquired captured image with high image quality (step S7). The extracting unit 17 outputs the image that has been extracted and the position information of the range that has been extracted to the transmission control unit 16 as an extracted image and the position information of a range.

When the extracted image and the position information of the range are input from the extracting unit 17 to the transmission control unit 16, the transmission control unit 16 transmits the extracted image and the position information of the range that have been input to the information processing apparatus 100 (step S8). The transmission control unit 16 determines whether or not to stop the transmission of the captured image (step S9). If the transmission of the captured image is not stopped (step S9: No), the transmission control unit 16 makes a return to the step S5. If the transmission of the captured image is stopped (step S9: Yes), the transmission control unit 16 stops the acquisition and transmission of the captured image to end the processing.

The acquiring unit 131 of the information processing apparatus 100 receives the extracted image and the position information of the range from the terminal apparatus 10 (step S10). Based on the received position information of the range, the acquiring unit 131 causes the display unit 111 to display the extracted image with the captured image (step S11). The acquiring unit 131 determines whether or not to stop the reception of the captured image (step S12). If the reception of the captured image is not stopped (step S12: No), the acquiring unit 131 makes a return to the step S3. If the reception of the captured image is stopped (step S12: Yes), the acquiring unit 131 stops the reception and display of the captured image to end the processing. This allows the terminal apparatus 10 to cause the image in the specified range to be displayed at the position according to the specified range in the captured image.

As above, when acquiring a captured image obtained by imaging by the camera 12, the terminal apparatus 10 transmits the acquired captured image to the information processing apparatus 100. Furthermore, when accepting an image acquisition request that is transmitted from the information processing apparatus 100 and includes range information, the terminal apparatus 10 extracts an image in the range according to the range information in the captured image obtained by imaging by the camera 12. Moreover, the terminal apparatus 10 transmits the extracted image and the position information of the range in the acquired captured image to the information processing apparatus 100. As a result, the image in the specified range may be displayed at the position according to the specified range in the captured image.

Furthermore, in the terminal apparatus 10, the range information is information that represents the range decided based on a position input in the information processing apparatus 100. As a result, the image in the specified range specified by the support person may be displayed at the position according to the specified range in the captured image.

Embodiment 2

Figure 6:
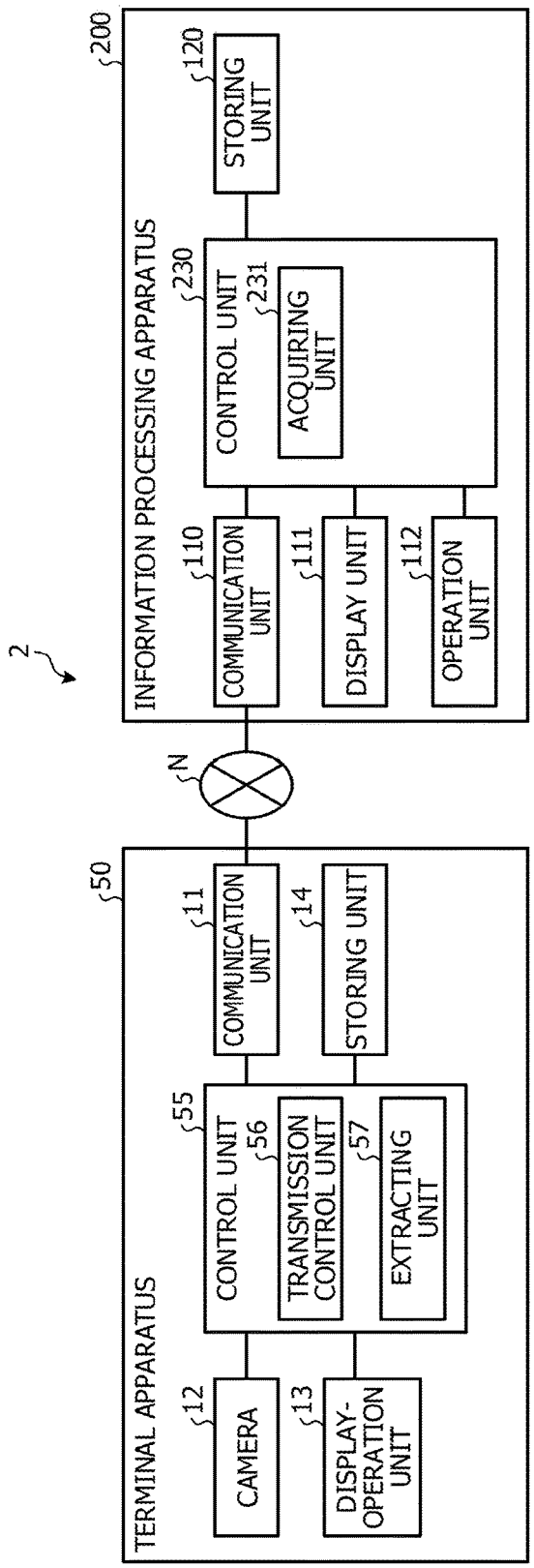
FIG. 6 is a block diagram illustrating one example of a configuration of a transmission control system of embodiment 2.

In the above-described embodiment 1, the range of the image to be extracted in a captured image is specified through input by mouse operation or the like by the support person. However, the range of the image to be extracted may be decided based on a reference object included in a captured image. An embodiment in this case will be described as embodiment 2. FIG. 6 is a block diagram illustrating one example of a configuration of a transmission control system of embodiment 2. A transmission control system 2 illustrated in FIG. 6 includes terminal apparatus 50 and information processing apparatus 200. The same configuration as the transmission control system 1 of embodiment 1 is given the same numeral and thereby description of the overlapping configuration and operation is omitted.

Compared with the control unit 15 of the terminal apparatus 10 of embodiment 1, a control unit 55 of the terminal apparatus 50 of embodiment 2 includes a transmission control unit 56 and an extracting unit 57 instead of the transmission control unit 16 and the extracting unit 17.

In the transmission control unit 56, an instruction to acquire the captured image obtained by imaging by the camera 12 and transmit the acquired captured image to the information processing apparatus 200 is made by operation by a worker, for example. The transmission control unit 56 starts transmission of the acquired captured image to the information processing apparatus 200 through the communication unit 11 and the network N. Furthermore, about the acquired captured image, the transmission control unit 56 executes marker recognition processing regarding a reference object that has been registered in advance, for example, an augmented reality (AR) marker or the like.

The transmission control unit 56 determines whether or not the already-registered marker has been recognized about the acquired captured image as the result of the marker recognition processing. If the already-registered marker has not been recognized, the transmission control unit 56 continuously executes the marker recognition processing about the captured image. If the already-registered marker has been recognized, the transmission control unit 56 outputs an image acquisition instruction to the extracting unit 57. Note that processing relating to transmission of an extracted image and the position information of a range in the transmission control unit 56 and processing relating to transmission stop are the same as embodiment 1 and therefore description of the processing is omitted.

When the image acquisition instruction is input from the transmission control unit 56 to the extracting unit 57, the extracting unit 57 acquires a captured image with high image quality from the camera 12. For example, the extracting unit 57 instructs the camera 12 to carry out imaging of an image with high image quality. The captured image with high image quality is a captured image with higher image quality than the captured image that is acquired by the transmission control unit 56 and is transmitted to the information processing apparatus 200, for example.

The extracting unit 57 extracts an image in the range according to range information corresponding to a marker from the acquired captured image with high image quality. The range information corresponding to a marker is stored in the storing unit 14 in advance in such a manner that the marker is associated with the coordinates of the range to be extracted. For example, the range information included in the accepted image acquisition request is information with which the reference object included in the captured image is identified. Furthermore, as with embodiment 1, the image extracted by the extracting unit 57 may be either a still image or a moving image in the range according to the range information. The extracting unit 57 outputs the image that has been extracted and the position information of the range that has been extracted to the transmission control unit 56 as the extracted image and the position information of the range.

Compared with the control unit 130 of the information processing apparatus 100 of embodiment 1, a control unit 230 of the information processing apparatus 200 of embodiment 2 includes an acquiring unit 231 instead of the acquiring unit 131. Furthermore, compared with the control unit 130, the control unit 230 does not include the specifying unit 132.

Processing of starting reception and display of the captured image in the acquiring unit 231 and processing relating to reception stop of the captured image are the same as embodiment 1 and therefore description of the processing is omitted.

The acquiring unit 231 determines whether or not an extracted image and the position information of a range have been received from the terminal apparatus 50 through the network N and the communication unit 110. If an extracted image and the position information of a range have been received, the acquiring unit 231 causes the display unit 111 to display the extracted image with the captured image based on the received position information of the range. If an extracted image and the position information of a range have not been received, the acquiring unit 231 continuously waits for reception of an extracted image and the position information of a range.

Figure 7:
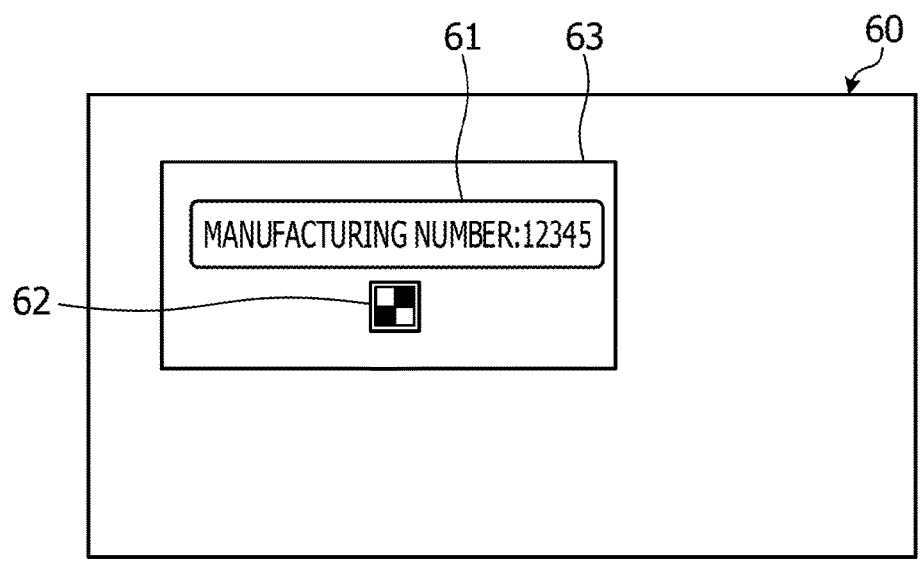
FIG. 7 is a diagram illustrating another example of display of an extracted image.

Here, display of an extracted image when a marker is used will be described by using FIG. 7. FIG. 7 is a diagram illustrating another example of display of an extracted image. A display screen 60 illustrated in FIG. 7 is one example of a captured image in which an extracted image 63 is displayed at the position according to the position information of the range based on range information corresponding to a marker 62 in the case in which the marker 62 is disposed near a nameplate 61 of a component in advance. For example, the extracted image 63 is what is obtained by extracting an image in the range according to the range information corresponding to the marker 62 from a captured image with high image quality in which it is possible to make out a manufacturing number on the nameplate 61 of the component.

Figure 8:
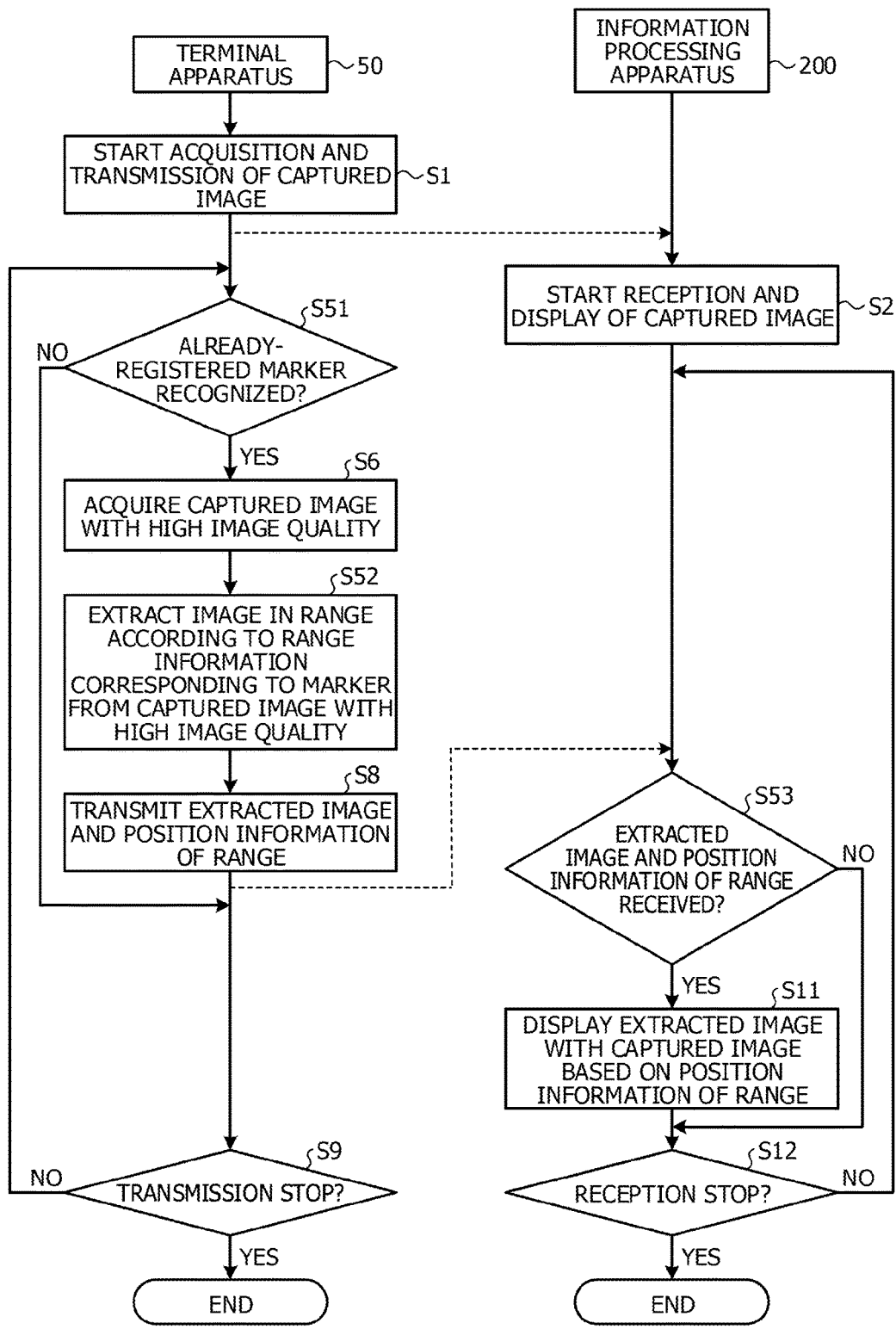
FIG. 8 is a sequence diagram illustrating one example of transmission control processing of embodiment 2.

Next, operation of the transmission control system 2 of embodiment 2 will be described. FIG. 8 is a sequence diagram illustrating one example of transmission control processing of embodiment 2. In the following description, the processing of steps S1, S2, S6, S8, S9, S11, and S12 is the same as embodiment 1 and therefore description of the processing is omitted.

The terminal apparatus 50 executes the following processing subsequently to the processing of the step S2. The transmission control unit 56 determines whether or not the already-registered marker has been recognized about the acquired captured image (step S51). If the already-registered marker has not been recognized (step S51: No), the transmission control unit 56 makes a transition to the step S9. If the already-registered marker has been recognized (step S51: Yes), the transmission control unit 56 outputs an image acquisition instruction to the extracting unit 57 and makes a transition to the step S6.

The terminal apparatus 50 executes the following processing subsequently to the processing of the step S6. The extracting unit 57 extracts an image in the range according to range information corresponding to the marker from the acquired captured image with high image quality (step S52). The extracting unit 57 outputs the image that has been extracted and the position information of the range that has been extracted to the transmission control unit 56 as an extracted image and the position information of a range, and makes a transition to the step S8.

The information processing apparatus 200 executes the following processing subsequently to the processing of the step S8. The acquiring unit 231 determines whether or not an extracted image and the position information of a range have been received from the terminal apparatus 50 (step S53). If an extracted image and the position information of a range have been received (step S53: Yes), the acquiring unit 231 makes a transition to the step S11. If an extracted image and the position information of a range have not been received (step S53: No), the acquiring unit 231 makes a transition to the step S12. This allows the terminal apparatus 50 to cause the image in the range based on the reference object to be displayed at the position according to the specified range in the captured image.

As above, in the terminal apparatus 50, the range information included in the accepted image acquisition request is information with which the reference object included in the captured image is identified. As a result, the image in the range based on the reference object may be displayed at the position according to the specified range in the captured image.

Embodiment 3

Figure 9:
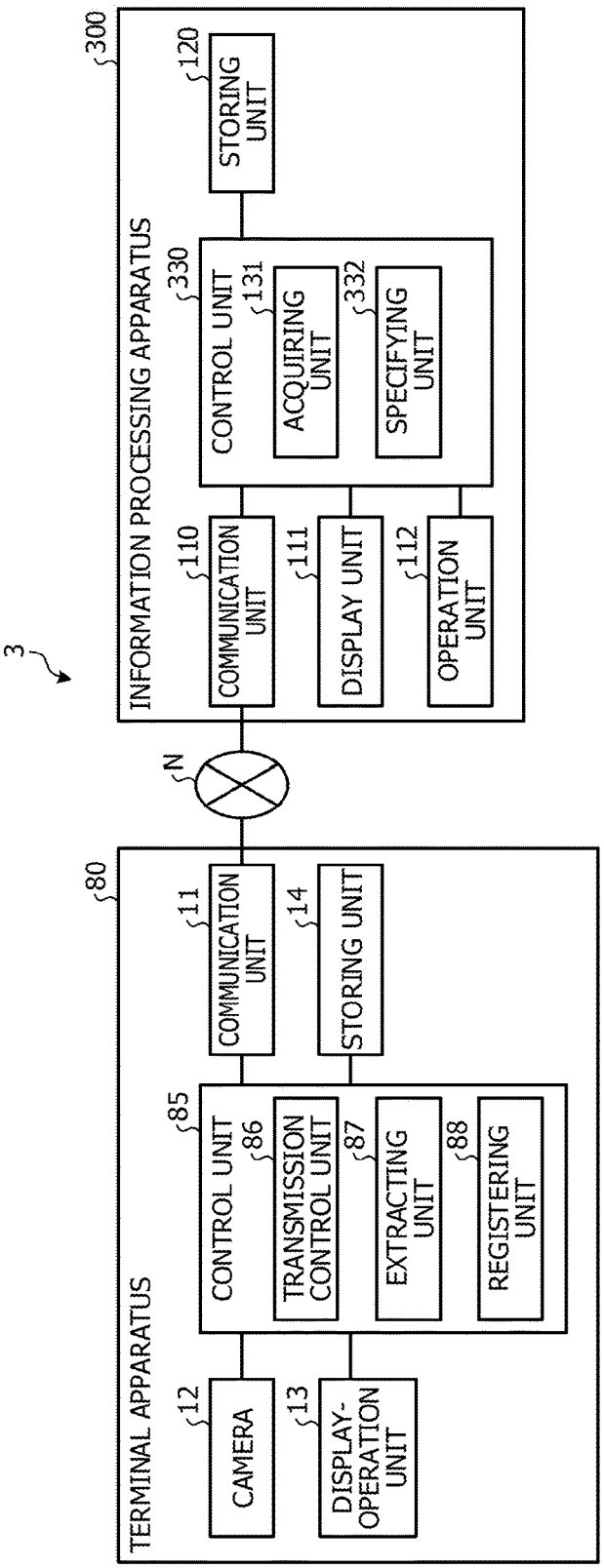
FIG. 9 is a block diagram illustrating one example of a configuration of a transmission control system of embodiment 3.

In the above-described embodiment 2, an image is extracted based on a marker that has been registered in advance. However, a support person may specify a marker on a captured image. An embodiment in this case will be described as embodiment 3. FIG. 9 is a block diagram illustrating one example of a configuration of a transmission control system of embodiment 3. A transmission control system 3 illustrated in FIG. 9 includes terminal apparatus 80 and information processing apparatus 300. The same configuration as the transmission control system 1 of embodiment 1 is given the same numeral and thereby description of the overlapping configuration and operation is omitted.

Compared with the control unit 15 of the terminal apparatus 10 of embodiment 1, a control unit 85 of the terminal apparatus 80 of embodiment 3 includes a transmission control unit 86 and an extracting unit 87 instead of the transmission control unit 16 and the extracting unit 17. Furthermore, compared with the control unit 15, the control unit 85 further includes a registering unit 88.

In the transmission control unit 86, an instruction to acquire the captured image obtained by imaging by the camera 12 and transmit the acquired captured image to the information processing apparatus 300 is made by operation by a worker, for example. The transmission control unit 86 starts transmission of the acquired captured image to the information processing apparatus 300 through the communication unit 11 and the network N. Furthermore, the transmission control unit 86 refers to the storing unit 14 and determines whether or not an already-registered marker exists. If an already-registered marker exists, the transmission control unit 86 outputs an image acquisition instruction to the extracting unit 87. If an already-registered marker does not exist, the transmission control unit 86 continuously determines whether or not an already-registered marker exists regarding the captured image. Processing relating to transmission of an extracted image and the position information of a range in the transmission control unit 86 and processing relating to transmission stop are the same as embodiment 1 and therefore description of the processing is omitted.

When the image acquisition instruction is input from the transmission control unit 86 to the extracting unit 87, the extracting unit 87 acquires a captured image with high image quality from the camera 12. For example, the extracting unit 87 instructs the camera 12 to carry out imaging of an image with high image quality. The captured image with high image quality is a captured image with higher image quality than the captured image that is acquired by the transmission control unit 86 and is transmitted to the information processing apparatus 300, for example.

The extracting unit 87 executes marker recognition processing regarding the acquired captured image with high image quality and determines whether or not the already-registered marker has been recognized. If the already-registered marker has been recognized, the extracting unit 87 extracts an image in the range according to range information corresponding to the already-registered marker from the captured image with high image quality. If the already-registered marker has not been recognized, the extracting unit 87 continuously executes the marker recognition processing about the captured image with high image quality. Furthermore, as with embodiment 1, the image extracted by the extracting unit 87 may be either a still image or a moving image in the range according to the range information. The extracting unit 87 outputs the image that has been extracted and the position information of the range that has been extracted to the transmission control unit 86 as the extracted image and the position information of the range.

The registering unit 88 determines whether or not a registration request has been received from the information processing apparatus 300 through the network N and the communication unit 11. If a registration request has been received, the registering unit 88 stores a marker in the storing unit 14 to register the marker based on marker specifying information included in the received registration request. As the marker (reference object) that may be registered, images of AR marker, nameplate and so forth are cited, for example. If a registration request has not been received, the registering unit 88 continuously waits for reception of a registration request.

Furthermore, when the transmission control unit 86 stops the acquisition and transmission of the captured image, the registering unit 88 deletes the information on the marker stored in the storing unit 14. For example, the registering unit 88 deregisters the marker.

Compared with the control unit 130 of the information processing apparatus 100 of embodiment 1, a control unit 330 of the information processing apparatus 300 of embodiment 3 includes a specifying unit 332 instead of the specifying unit 132.

The specifying unit 332 determines whether or not specifying of a marker has been input to a captured image displayed on the display unit 111 from a support person through the operation unit 112. If specifying of a marker has been input, the specifying unit 332 transmits a registration request including the input marker specifying information to the terminal apparatus 80 through the communication unit 110 and the network N. If specifying of a marker has not been input, the specifying unit 332 continuously waits for input of specifying of a marker.

Figure 10:
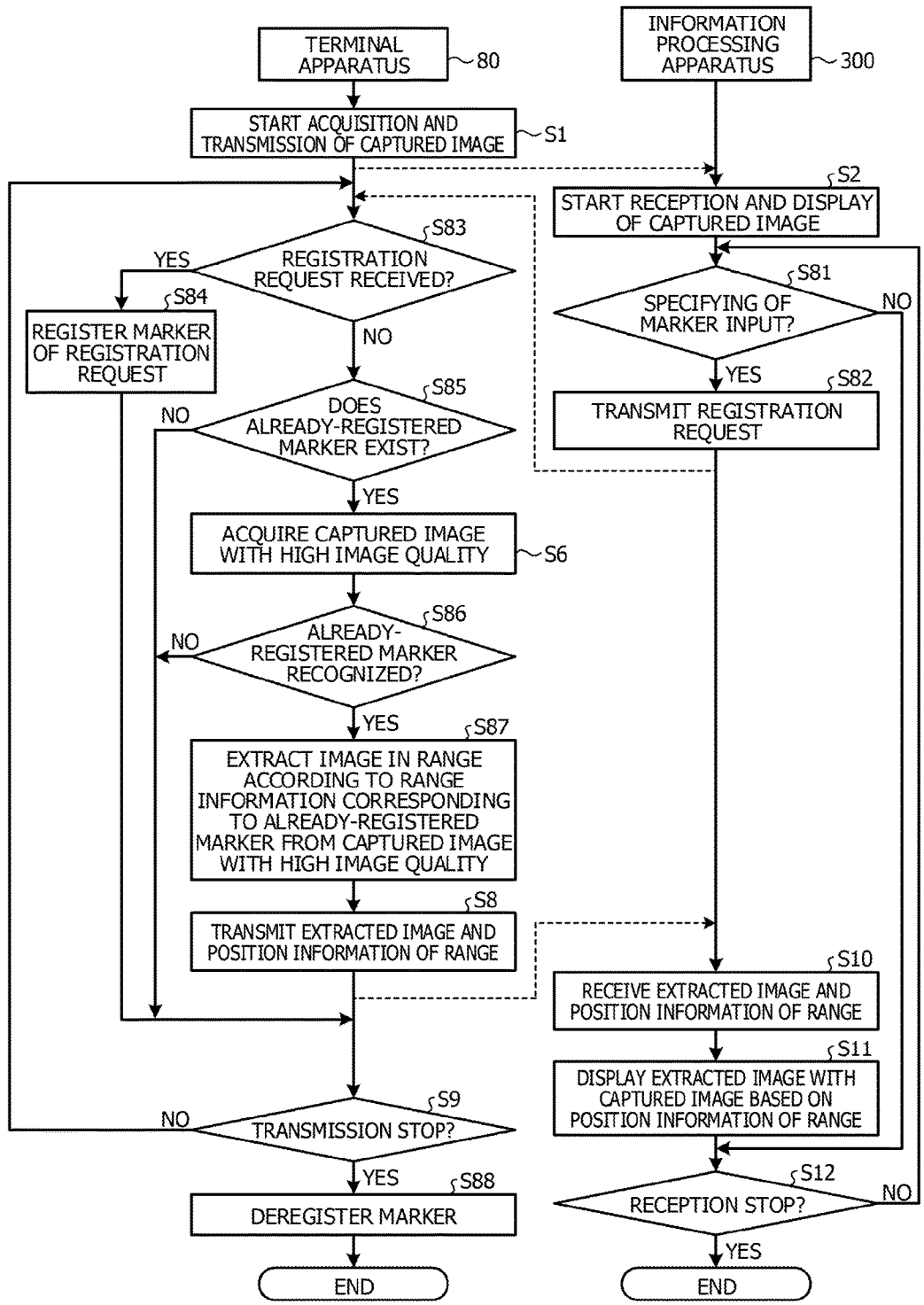
FIG. 10 is a sequence diagram illustrating one example of transmission control processing of embodiment 3.

Next, operation of the transmission control system 3 of embodiment 3 will be described. FIG. 10 is a sequence diagram illustrating one example of transmission control processing of embodiment 3. In the following description, the processing of steps S1, S2, S6, and S8 to S12 is the same as embodiment 1 and therefore description of the processing is omitted.

The information processing apparatus 300 executes the following processing subsequently to the processing of the step S2. The specifying unit 332 determines whether or not specifying of a marker has been input (step S81). If specifying of a marker has been input (step S81: Yes), the specifying unit 332 transmits a registration request including the input marker specifying information to the terminal apparatus 80 (step S82). If specifying of a marker has not been input (step S81: No), a transition is made to the step S12.

The registering unit 88 of the terminal apparatus 80 determines whether or not a registration request has been received from the information processing apparatus 300 (step S83). If a registration request has been received (step S83: Yes), the registering unit 88 registers the marker specifying information of the received registration request, for example, a marker, in the storing unit 14 (step S84) and makes a transition to the step S9. If a registration request has not been received (step S83: No), the registering unit 88 continuously waits for reception of a registration request and makes a transition to the step S85.

The transmission control unit 86 refers to the storing unit 14 and determines whether or not an already-registered marker exists (step S85). If an already-registered marker does not exist (step S85: No), the transmission control unit 86 makes a transition to the step S9. If an already-registered marker exists (step S85: Yes), the transmission control unit 86 outputs an image acquisition instruction to the extracting unit 87 and makes a transition to the step S6.

The terminal apparatus 80 executes the following processing subsequently to the processing of the step S6. The extracting unit 87 executes the marker recognition processing regarding the acquired captured image with high image quality and determines whether or not the already-registered marker has been recognized (step S86). If the already-registered marker has been recognized (step S86: Yes), the extracting unit 87 extracts an image in the range according to range information corresponding to the already-registered marker from the captured image with high image quality (step S87). The extracting unit 87 outputs the image that has been extracted and the position information of the range that has been extracted to the transmission control unit 86 as an extracted image and the position information of a range, and makes a transition to the step S8. If the already-registered marker has not been recognized (step S86: No), the extracting unit 87 makes a transition to the step S9.

In the case of Yes in the step S9, the terminal apparatus 80 executes the following processing. When the transmission control unit 86 stops the acquisition and transmission of the captured image, the registering unit 88 deregisters the marker (step S88) to end the processing. This allows the terminal apparatus 80 to cause the image in the range based on the reference object specified by the support person to be displayed at the position according to the specified range in the captured image.

Embodiment 4

Figure 11:
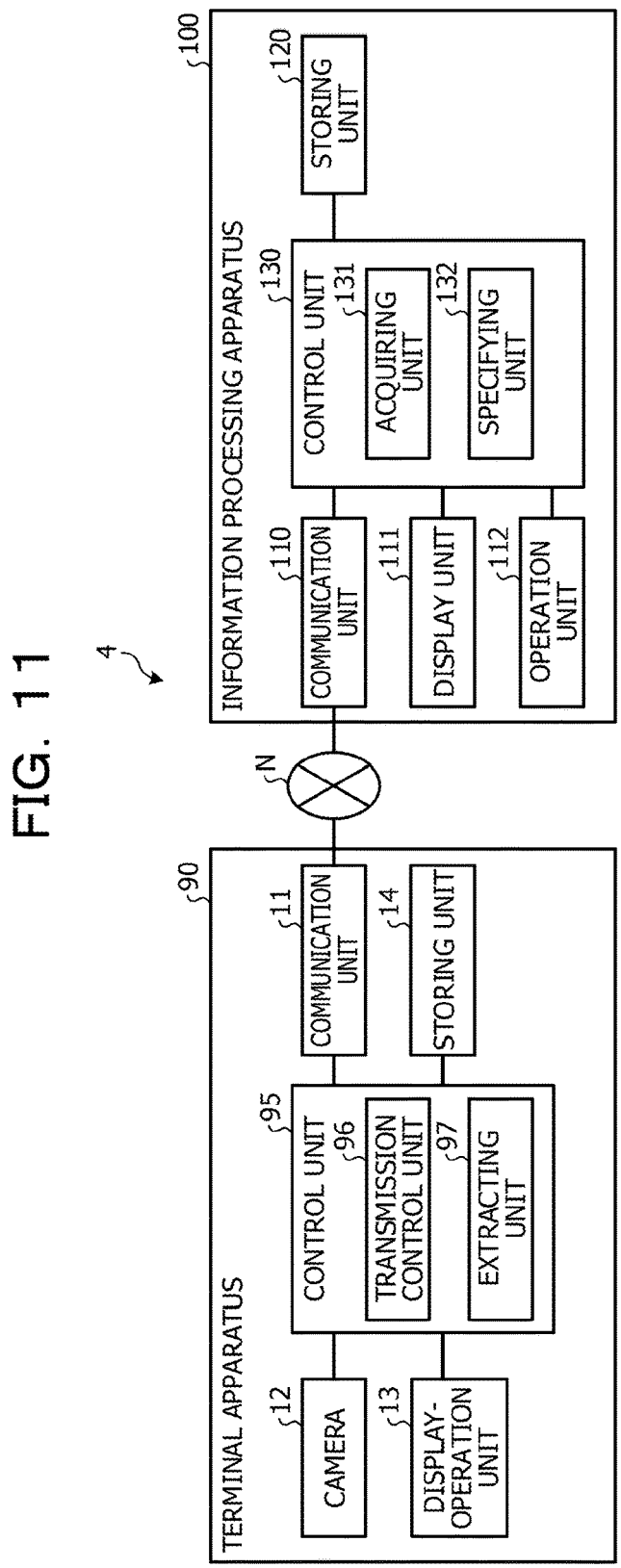
FIG. 11 is a block diagram illustrating one example of a configuration of a transmission control system of embodiment 4.

In the above-described embodiment 1, the position information of the range from which an extracted image has been extracted is transmitted to the information processing apparatus 100. However, the position information of the range of an extracted image may be decided based on pattern matching between the extracted image and a captured image obtained previously or subsequently to transmission of the extracted image. An embodiment in this case will be described as embodiment 4. FIG. 11 is a block diagram illustrating one example of a configuration of a transmission control system of embodiment 4. A transmission control system 4 illustrated in FIG. 11 includes terminal apparatus 90 and the information processing apparatus 100. The same configuration as the transmission control system 1 of embodiment 1 is given the same numeral and thereby description of the overlapping configuration and operation is omitted.

Compared with the control unit 15 of the terminal apparatus 10 of embodiment 1, a control unit 95 of the terminal apparatus 90 of embodiment 4 includes a transmission control unit 96 and an extracting unit 97 instead of the transmission control unit 16 and the extracting unit 17.

In the transmission control unit 96, an instruction to acquire the captured image obtained by imaging by the camera 12 and transmit the acquired captured image to the information processing apparatus 100 is made by operation by a worker, for example. The transmission control unit 96 starts transmission of the acquired captured image to the information processing apparatus 100 through the communication unit 11 and the network N. For example, every time the transmission control unit 96 acquires a low-quality image that is a captured image from the camera 12, the transmission control unit 96 transmits the acquired low-quality image to the information processing apparatus 100.

When an extracted image and the position information of a range are input from the extracting unit 97 to the transmission control unit 96, the transmission control unit 96 transmits the extracted image and the position information of the range that have been input to the information processing apparatus 100 through the communication unit 11 and the network N. For example, the transmission control unit 96 transmits, to the information processing apparatus 100, the position information of a range that reflects the deviation between a high-quality partial image extracted from a high-quality image and a low-quality image of the transmission target at the time of transmission of this high-quality partial image, together with the high-quality partial image. For example, the transmission control unit 96 transmits, to the information processing apparatus 100, the extracted image that is the high-quality partial image and the newly-acquired position information of the extracted image in the captured image that is the low-quality image.

After the acquisition of the high-quality image by the extracting unit 97, the transmission control unit 96 returns to the mode of acquiring a low-quality image and transmitting the low-quality image to the information processing apparatus 100 again. In this case, because the acquisition and transmission of the low-quality image is repeated, there is a possibility that the imaging target has varied from the timing of acquisition of a high-quality partial image regarding the low-quality image of the target of superposition display of the high-quality partial image.

The transmission control unit 96 determines whether or not to stop the transmission of the captured image that is the low-quality image based on input of stop operation by the worker and so forth, for example. If the transmission of the captured image is not stopped, the transmission control unit 96 continuously carries out the acquisition and transmission of the captured image. If the transmission of the captured image is stopped, the transmission control unit 96 stops the acquisition and transmission of the captured image.

The extracting unit 97 determines whether or not an image acquisition request has been received from the information processing apparatus 100 through the network N and the communication unit 11. If an image acquisition request has not been received, the extracting unit 97 continuously waits for reception of an image acquisition request. If an image acquisition request has been received, the extracting unit 97 acquires a high-quality image that is a captured image with high image quality from the camera 12. For example, the extracting unit 97 instructs the camera 12 to carry out imaging of an image with high image quality. The high-quality image is a captured image with high image quality compared with the low-quality image that is acquired by the transmission control unit 96 and is transmitted to the information processing apparatus 100, for example.

The extracting unit 97 extracts, from the acquired high-quality image, an image in the range according to range information included in the image acquisition request as a high-quality partial image. The high-quality partial image extracted by the extracting unit 97 may be either a still image or a moving image in the range according to the range information. The extracting unit 97 employs the extracted high-quality partial image or a low-quality image acquired immediately before or immediately after the high-quality partial image as a reference image and executes pattern matching between the reference image and a low-quality image of the transmission target at the time of transmission of the high-quality partial image. For example, the extracting unit 97 executes the pattern matching between the reference image at the time of transmission of the high-quality partial image and the low-quality image on which this high-quality partial image is to be displayed in a superimposed manner.

As the result of the pattern matching, the extracting unit 97 identifies the deviation of the low-quality image of the target of superposition display with respect to the reference image and generates correction information. The extracting unit 97 corrects the position information of the range from which the high-quality partial image has been extracted by using the generated correction information. The extracting unit 97 outputs the corrected position information of the range and the extracted image, which is the high-quality partial image, to the transmission control unit 96. The range information included in the image acquisition request is information that represents the range decided based on a position input in the information processing apparatus 100.

Figure 12:
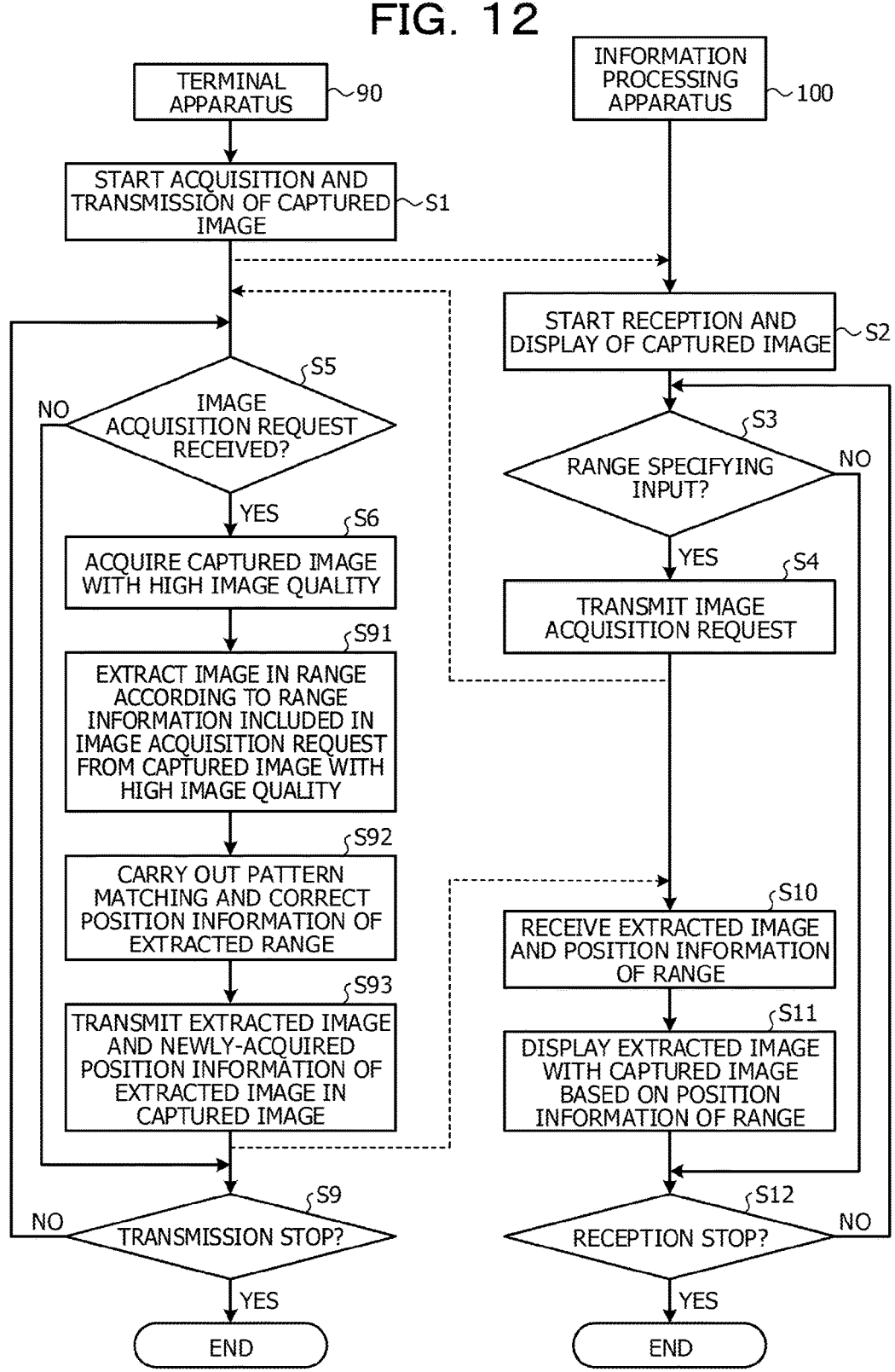
FIG. 12 is a sequence diagram illustrating one example of transmission control processing of embodiment 4.

Next, operation of the transmission control system 4 of embodiment 4 will be described. FIG. 12 is a sequence diagram illustrating one example of transmission control processing of embodiment 4. In the following description, the processing of steps S1 to S6 and S9 to S12 is the same as embodiment 1 and therefore description of the processing is omitted.

The terminal apparatus 90 executes the following processing subsequently to the processing of the step S6. The extracting unit 97 extracts an image in the range according to range information included in the image acquisition request as a high-quality partial image from the acquired captured image with high image quality, for example, a high-quality image (step S91). The extracting unit 97 carries out pattern matching between a reference image at the time of transmission of the high-quality partial image and a low-quality image on which this high-quality partial image is to be displayed in a superimposed manner, and corrects the position information of the extracted range (step S92). The extracting unit 97 outputs the corrected position information of the range and the extracted image that is the high-quality partial image to the transmission control unit 96.

When the extracted image and the position information of the range are input from the extracting unit 97 to the transmission control unit 96, the transmission control unit 96 transmits, to the information processing apparatus 100, the extracted image and the position information of the range that have been input, for example, the extracted image and the newly-acquired position information of the extracted image in the captured image (step S93) and makes a transition to the step S9. This allows the terminal apparatus 90 to cause the high-quality partial image to be displayed at the proper position in the low-quality image in a superimposed manner even when the low-quality image on which the high-quality partial image is to be displayed in a superimposed manner varies. Furthermore, the terminal apparatus 90 displays a high-quality partial image as a still image on a low-quality image as a moving image in a superimposing manner, for example, and, due to this, does not retransmit the high-quality partial image. Thus, the amount of data transfer may be reduced.

The feature that, when the low-quality image on which a high-quality partial image is to be displayed in a superimposed manner varies, the position at which the high-quality partial image is displayed in a superimposed manner is made to follow the variation is possible also in the above-described embodiments 2 and 3. For example, in the terminal apparatus 50 of embodiment 2, when a marker that appears in low-quality image moves, the position represented by the position information of the range of a high-quality partial image becomes a position based on the marker. Thus, on the side of the information processing apparatus 200, the display position of the high-quality partial image moves in such a manner as to follow the marker. Furthermore, regarding the feature that retransmission is not carried out if the high-quality partial image is a still image, the amount of data transfer may be reduced also in the above-described embodiments 1 to 3 as with embodiment 4.

As above, in response to acceptance of the image acquisition request, the terminal apparatus 90 acquires the high-quality image with higher image quality than the captured image from the camera 12 and extracts an image in the range according to the range information from the acquired high-quality image. As a result, the high-quality image in the range based on the image acquisition request may be displayed at the position according to the specified range in the captured image.

In the above-described respective embodiments, images are shared between the terminal apparatus 10, 50, 80, or 90 of one worker and the information processing apparatus 100, 200, or 300 of one support person. However, the configuration is not limited thereto. For example, images may be shared and remote support may be carried out between the terminal apparatus 10, 50, 80, or 90 of one worker and pieces of the information processing apparatus 100, 200, or 300 of plural support persons. Furthermore, images may be shared and remote support may be carried out between pieces of the terminal apparatus 10, 50, 80, or 90 of plural workers and the information processing apparatus 100, 200, or 300 of one support person. Moreover, images may be shared and remote support may be carried out between pieces of the terminal apparatus 10, 50, 80, or 90 of plural workers and pieces of the information processing apparatus 100, 200, or 300 of plural support persons.

Furthermore, the respective constituent elements of the respective units that are diagrammatically represented do not necessarily have to be configured as diagrammatically represented physically. For example, concrete forms of distribution and integration of the respective units are not limited to the diagrammatically-represented forms and all or part of the respective units may be configured to be distributed or integrated functionally or physically in an arbitrary unit according to various kinds of loads, the status of use and so forth. For example, the transmission control unit 16 and the extracting unit 17 may be integrated. Furthermore, the respective kinds of processing that are diagrammatically represented are not limited to the above-described order and may be simultaneously executed and be executed with change in the order within such a range as not to cause contradiction of the contents of processing.

Moreover, all or an arbitrary part of various kinds of processing functions carried out in the respective pieces of apparatus may be carried out on a CPU (or microcomputer such as an MPU or a micro controller unit (MCU)). Furthermore, it goes without saying that all or an arbitrary part of the various kinds of processing functions may be carried out on a program analyzed and executed by the CPU (or microcomputer such as an MPU or MCU) or on hardware based on wired logic.

Figure 13:
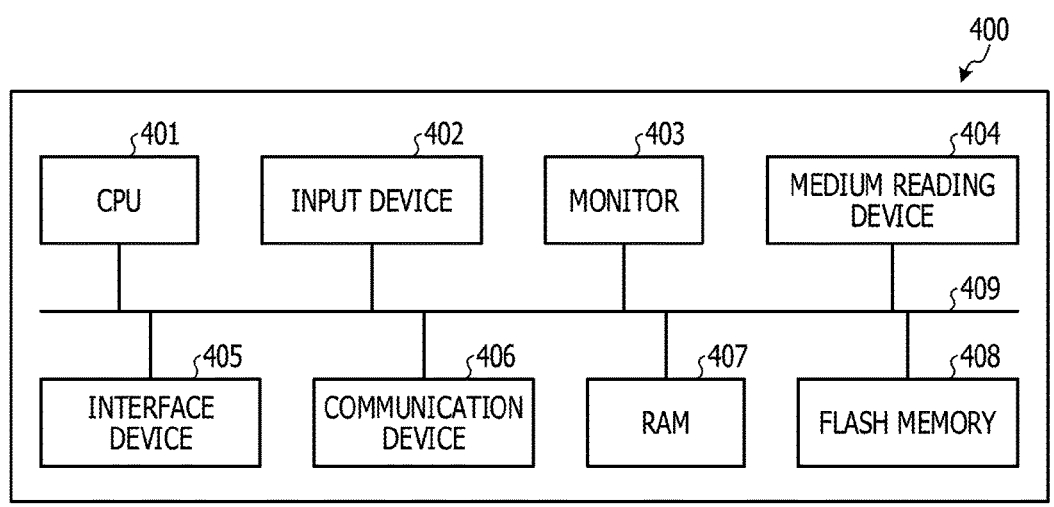
FIG. 13 is a diagram illustrating one example of a computer that executes a transmission control program.

Incidentally, various kinds of processing explained in the above-described embodiments may be implemented by executing a program prepared in advance by a computer. Therefore, in the following, one example of a computer that executes a program having the same functions as the above-described embodiments will be described. FIG. 13 is a diagram illustrating one example of a computer that executes a transmission control program.

As illustrated in FIG. 13, a computer 400 includes a CPU 401 that executes various kinds of arithmetic processing, an input device 402 that accepts data input, and a monitor 403. Furthermore, the computer 400 includes a medium reading device 404 that reads a program and so forth from a storage medium, an interface device 405 for coupling to various kinds of apparatus, and a communication device 406 for coupling to other pieces of information processing apparatus and so forth by a wired or wireless measure. Moreover, the computer 400 includes a RAM 407 that temporarily stores various kinds of information and a flash memory 408. In addition, the respective devices 401 to 408 are coupled to a bus 409.

In the flash memory 408, a transmission control program having the same functions as the respective processing units of the transmission control unit 16 and the extracting unit 17 illustrated in FIG. 1 is stored. Furthermore, a transmission control program having the same functions as the respective processing units of the transmission control unit 56 and the extracting unit 57 illustrated in FIG. 6 may be stored in the flash memory 408. Moreover, a transmission control program having the same functions as the respective processing units of the transmission control unit 86, the extracting unit 87, and the registering unit 88 illustrated in FIG. 9 may be stored in the flash memory 408. In addition, a transmission control program having the same functions as the respective processing units of the transmission control unit 96 and the extracting unit 97 illustrated in FIG. 11 may be stored in the flash memory 408. Furthermore, various kinds of data for implementing the transmission control program are stored in the flash memory 408. For example, the input device 402 has the same functions as the display-operation unit 13 illustrated in FIG. 1, FIG. 6, FIG. 9, or FIG. 11 and accepts input of various kinds of information such as operation information from a user of the computer 400. For example, the monitor 403 has the same functions as the display-operation unit 13 illustrated in FIG. 1, FIG. 6, FIG. 9, or FIG. 11 and displays various kinds of screens such as a display screen to the user of the computer 400. To the interface device 405, for example, an HMD or the like is coupled. For example, the communication device 406 has the same functions as the communication unit 11 illustrated in FIG. 1, FIG. 6, FIG. 9, or FIG. 11 and is coupled to the information processing apparatus 100, 200, or 300 to exchange various kinds of information with the information processing apparatus 100, 200, or 300.

The CPU 401 executes various kinds of processing by reading out the respective programs stored in the flash memory 408 and loading the programs into the RAM 407 to execute the programs. Furthermore, these programs may cause the computer 400 to function as the transmission control unit 16 and the extracting unit 17 illustrated in FIG. 1. Alternatively, these programs may cause the computer 400 to function as the transmission control unit 56 and the extracting unit 57 illustrated in FIG. 6. Alternatively, these programs may cause the computer 400 to function as the transmission control unit 86, the extracting unit 87, and the registering unit 88 illustrated in FIG. 9. Alternatively, these programs may cause the computer 400 to function as the transmission control unit 96 and the extracting unit 97 illustrated in FIG. 11.

The above-described transmission control program does not necessarily have to be stored in the flash memory 408. For example, the computer 400 may read out and execute the program stored in a storage medium that is readable by the computer 400. Portable recording media such as compact disc read-only memory (CD-ROM), digital versatile disc (DVD) disc, and universal serial bus (USB) memory, semiconductor memories such as a flash memory, hard disk drives and so forth correspond to the storage medium that is readable by the computer 400. Furthermore, this transmission control program may be stored in apparatus coupled to a public line, the Internet, a LAN or the like and the computer 400 may read out the transmission control program from this communication medium and execute the transmission control program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A transmission control device comprising:
a memory; and
a processor coupled to the memory and the processor configured to:
transmit a first captured image to an apparatus when acquiring the first captured image obtained by imaging by a camera,
receive a request including first range information from the apparatus after transmitting the first captured image,
extract a first image from a second captured image in accordance with the first range information, the second captured image being obtained by imaging by the camera,
perform comparison of the extracted first image and a third captured image obtained by imaging by the camera,
determine, by a result of the comparison, first position information of a range corresponding to the extracted first image in the third captured image, and
transmit the extracted first image, the third captured image, and the first position information to the apparatus.

2. The transmission control device according to claim 1, wherein the first image is displayed on the third captured image in a superimposed manner based on the first position information in the apparatus.

3. The transmission control device according to claim 1, wherein the first range information is information that represents a range decided based on an input in the apparatus.

4. The transmission control device according to claim 1, wherein the first range information includes information indicating a reference object included in the second captured image.

5. The transmission control device according to claim 2, wherein the processor further configured to cause the camera to capture the second captured image in higher image quality than the first captured image in response to receiving the request.

6. The transmission control device according to claim 1, wherein the camera is mounted on a head-mounted display.

7. The transmission control device according to claim 1, wherein the processor further configured to:
- detect a reference included in a fourth captured image obtained by imaging by the camera,
- extract a second image from a fifth captured image in accordance with second range information associated with the reference, the fifth captured image being obtained by imaging by the camera, the fifth captured image being higher image quality than the fourth captured image, and
- transmit the second image and second position information of a range corresponding to the second range information in the fifth captured image to the apparatus.

8. A transmission control method executed by a computer, the method comprising:
- transmitting a first captured image to an apparatus when acquiring the first captured image obtained by imaging by a camera;
- receiving a request including first range information from the apparatus after the transmitting of the first captured image;
- extracting a first image from a second captured image in accordance with the first range information, the second captured image being obtained by imaging by the camera;
- comparing the extracted first image with a third captured image obtained by imaging by the camera;
- determining, by a result of the comparing, first position information of a range corresponding to the first range information in the third captured image; and
- transmitting the extracted first image, the third captured image, and the first position information to the apparatus.

9. The transmission control method according to claim 8, wherein the first image is displayed on the third captured image in a superimposed manner based on the first position information in the apparatus.

10. The transmission control method according to claim 8, wherein the first range information is information that represents a range decided based on an input in the apparatus.

11. The transmission control method according to claim 8, wherein the first range information includes information indicating a reference object included in the second captured image.

12. The transmission control method according to claim 9, wherein the processor further configured to cause the camera to capture the second captured image in higher image quality than the first captured image in response to receiving the request.

13. The transmission control method according to claim 8, wherein the camera is mounted on a head-mounted display.

14. The transmission control method according to claim 8, further comprising:
- detecting a reference included in a fourth captured image obtained by imaging by the camera,
- extracting a second image from a fifth captured image in accordance with second range information associated with the reference, the fifth captured image being obtained by imaging by the camera, the fifth captured image being higher image quality than the fourth captured image, and
- transmitting the second image and second position information of a range corresponding to the second range information in the fifth captured image to the apparatus.

15. A non-transitory computer-readable medium storing a transmission control program that causes a computer to execute a process comprising:
- transmitting a first captured image to an apparatus when acquiring the first captured image obtained by imaging by a camera;
- receiving a request including range information from the apparatus after the transmitting of the first captured image;
- extracting a first image from a second captured image in accordance with the range information, the second captured image being obtained by imaging by the camera;
- comparing the extracted first image with a third captured image obtained by imaging by the camera;
- determining, by a result of the comparing, position information of a range corresponding to the range information in the third captured image; and
- transmitting the extracted first image, the third captured image, and the position information to the apparatus.

* * * * *